United States Patent
Martella et al.

(10) Patent No.: US 9,476,001 B2
(45) Date of Patent: Oct. 25, 2016

(54) PROCESS AND APPARATUS FOR THE TREATMENT OF TAR IN SYNGAS

(75) Inventors: Michael Joseph Martella, Cardiff (GB); Dongke Zhang, Rossmoyne (AU)

(73) Assignee: ANSAC Pty Ltd, Bunbury (AU)

( * ) Notice: Subject to any disclaimer, the term of this patent is extended or adjusted under 35 U.S.C. 154(b) by 776 days.

(21) Appl. No.: 13/698,004

(22) PCT Filed: May 13, 2011

(86) PCT No.: PCT/AU2011/000563
§ 371 (c)(1),
(2), (4) Date: Feb. 26, 2013

(87) PCT Pub. No.: WO2011/140610
PCT Pub. Date: Nov. 17, 2011

(65) Prior Publication Data
US 2013/0291437 A1    Nov. 7, 2013

(30) Foreign Application Priority Data

May 14, 2010 (AU) ................................ 2010902088

(51) Int. Cl.
*C10B 47/30* (2006.01)
*C10B 53/02* (2006.01)
(Continued)

(52) U.S. Cl.
CPC .............. *C10K 3/023* (2013.01); *C10B 47/30* (2013.01); *C10B 53/02* (2013.01); *C10J 3/002* (2013.01); *C10J 3/84* (2013.01); *C10K 1/22* (2013.01); *C10K 1/32* (2013.01); *C10K 3/00* (2013.01); *C10J 2300/093* (2013.01); *C10J 2300/0916* (2013.01); *C10J 2300/1246* (2013.01);

(Continued)

(58) Field of Classification Search
CPC combination set(s) only.
See application file for complete search history.

(56) References Cited

U.S. PATENT DOCUMENTS 4,198,212 A * 4/1980 Tsao ........................ C10B 49/10
122/5
4,865,625 A     9/1989 Mudge et al.
(Continued)

FOREIGN PATENT DOCUMENTS

EP    1312662    5/2003
GB    793035     4/1958

OTHER PUBLICATIONS

International Search Report for PCT/AU2011000563 dated Jun. 23, 2011, 4 pages.
(Continued)

*Primary Examiner* — Matthew Merkling
(74) *Attorney, Agent, or Firm* — Reising Ethington P.C.

(57) ABSTRACT

The present invention relates to a method and apparatus (10) for use in rarefying a syngas so as to improve a calorific value of the syngas through the reduction of a concentration of tar from the syngas. The apparatus (10) comprises a gasification/pyrolysis means (12) such as a kiln (11), for generation of a flow of syngas from a raw material, and a cracking means (14). The cracking means (14) comprising a body (42) having an insulated internal volume (44) adapted to hold a heated bed of char. The flow of syngas from the kiln (11) is directed through the cracking means (14) where it comes into contact with the heated bed of char. Heavy long-chained carbon based molecules within the syngas undergo a cracking reaction and are broken into constituent lighter carbon based molecules. The method and apparatus of the present invention provides a rarefied output flow of syngas having an improved calorific quality and a substantially reduced concentration of tar.

12 Claims, 1 Drawing Sheet

(51) Int. Cl.
  *C10J 3/84* (2006.01)
  *C10K 1/22* (2006.01)
  *C10K 1/32* (2006.01)
  *C10K 3/02* (2006.01)
  *C10K 3/00* (2006.01)
  *C10J 3/00* (2006.01)

(52) U.S. Cl.
  CPC . *C10J2300/1656* (2013.01); *C10J 2300/1671* (2013.01); *Y02E 50/14* (2013.01); *Y02P 20/145* (2015.11)

(56) References Cited

U.S. PATENT DOCUMENTS

| | | | | |
|---|---|---|---|---|
| 9,023,121 | B2* | 5/2015 | Tyll | 48/61 |
| 2007/0006528 | A1* | 1/2007 | Diebold et al. | 48/197 R |
| 2007/0261948 | A1 | 11/2007 | Jacobsen | |
| 2009/0118561 | A1* | 5/2009 | Vera | 588/311 |
| 2010/0096594 | A1 | 4/2010 | Dahlin et al. | |
| 2011/0308155 | A1* | 12/2011 | Paskach | C10J 3/463 48/77 |
| 2012/0167585 | A1* | 7/2012 | Wormser | C10K 1/024 60/781 |
| 2013/0153826 | A1* | 6/2013 | Paquet | C01B 3/02 252/373 |

OTHER PUBLICATIONS

Written Opinion for PCT/AU2011000563 dated Jun. 23, 2011, 5 pages.
International Preliminary Report on Patentability, Apr. 10, 2012, 3 pages.

* cited by examiner

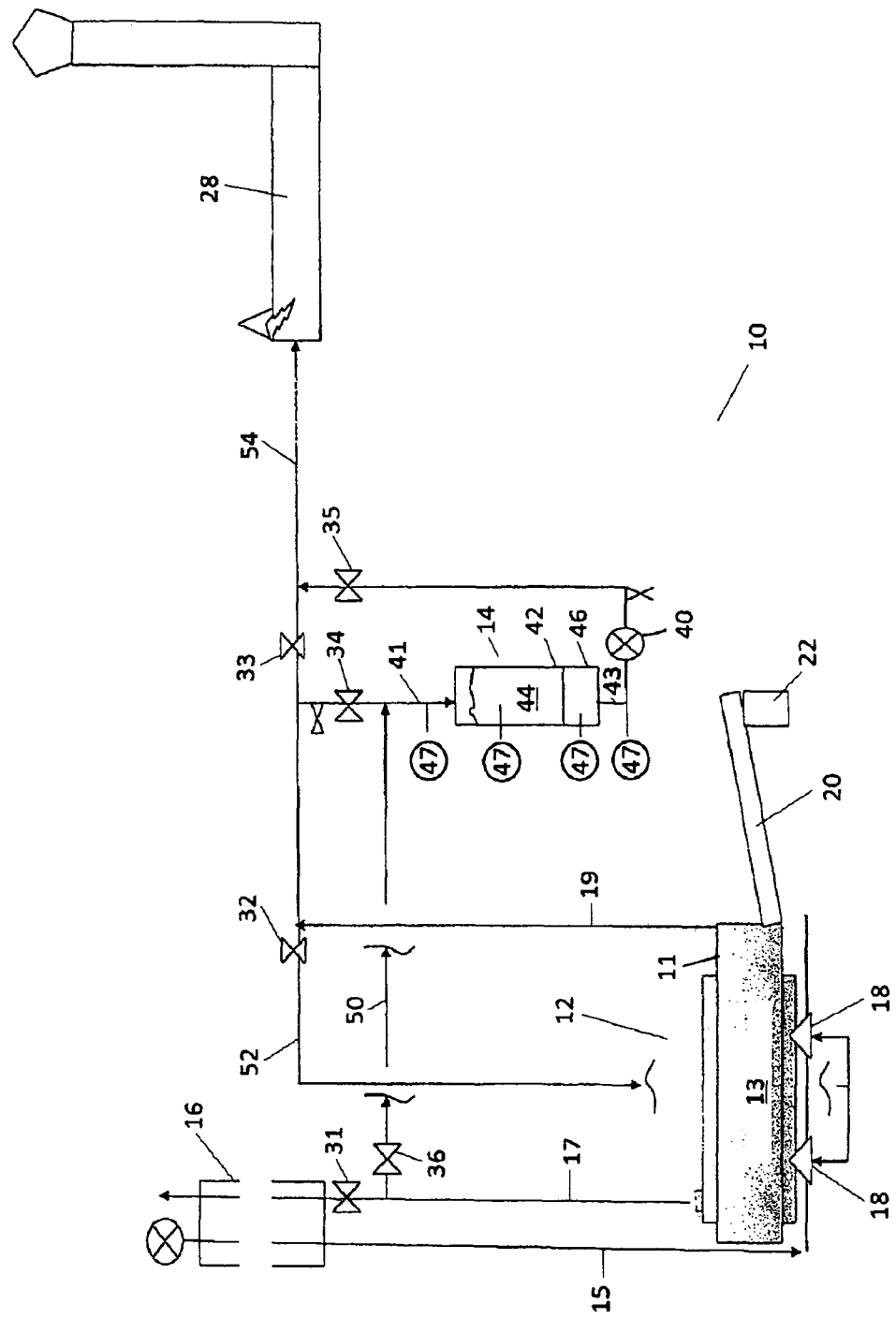

PROCESS AND APPARATUS FOR THE TREATMENT OF TAR IN SYNGAS

TECHNICAL FIELD

The present invention relates to a process and apparatus for the rarefication of syngas.

In particular the present invention relates to a process and apparatus for the treatment of tar in a syngas with a consequent improvement of a calorific value of the syngas.

BACKGROUND

It is known in the art to use a gasification process to convert a carbonaceous material into carbon monoxide and hydrogen. Generally a conversion is achieved by exposing a raw carbonaceous material at high temperature, often in excess of 850° C., with a controlled feed of oxygen or steam. A resultant gas that is produced is known as a synthesis gas or syngas. The syngas is a combustible energy source and can be more effectively and efficiently utilised in subsequent operations than a direct combustion of the original raw carbonaceous material itself.

Similarly, it is know to use a pyrolysis process to induce a chemical decomposition of a carbonaceous material to form a char and a syngas. Generally the pyrolysis process is similar to a gasification process though it occurs at a lower temperature (upward of 750° C.) and produces a solid residue rich in carbon content in addition to the syngas.

The carbonaceous material used for fuel in the above-mentioned processes is often a biomass fuel. Biomass is generally biological matter derived from living organisms of both plant and animal variety. Biomass fuel is specifically carbon based and composed of organic molecules containing hydrogen. Biomass may include such organic material as garbage, waste (including plastics waste) and wood. Fossil fuels such as coal and oil are not generally included under the blanket name of biomass.

As mentioned above the gasification/pyrolysis process results in a gas mixture (syngas) containing various amounts of carbon monoxide and hydrogen. However, with certain fuels it is a problem that the syngas produced is rich in heavy long-chained carbon molecules or tar. Because of their large molecular weight the long-chained carbon molecules have a relatively low dew point and in practice these larger molecules tend to form tar deposits at cold spots in the pipework or in other gas cleaning apparatus or equipment. Such tar deposits can be a hindrance to the process by causing full or partial blockages leading to a consequent over pressurization and a decreased system performance, increased maintenance costs or significant equipment damage.

It is known in the art to use a scrubber to condense a tar deposit in order to form tar balls which can then be removed mechanically. It is also known to use oxygen injection to remove deposits in pipework however this method is not always suitable for subsequent direct injection of the syngas into, for example, a gas turbine. It is known to use catalysts which have proven to greatly reduce the formation of tar deposits however catalyst handling and regeneration all add significant costs to the process. Catalysts also increase head load and tube abrasion. Further process stages and costs are incurred at the end of the process in order to separate the catalyst from the char.

Using these methods the long-chained carbon molecules can be removed from the syngas, however the calorific value of the resultant syngas is correspondingly reduced.

SUMMARY

The present invention attempts to overcome at least in part the aforementioned disadvantages of previous methods of reducing a concentration of long-chained carbon molecules from a syngas.

A further object of the present invention is to provide an apparatus and a method for treating tar in a syngas to improve a calorific value of the syngas.

In accordance with one aspect of the present invention there is provided an apparatus for use in treating tar in a syngas, the apparatus comprising a gasification/pyrolysis means in gaseous communication with a cracking means, wherein a flow of syngas produced by the gasification/pyrolysis means is directed to pass through the cracking means so as to rarefy the syngas by reducing a concentration of long-chained carbon molecules in the syngas.

In another aspect of the present invention the cracking means of the apparatus comprises chemically active substance arranged to receive a flow of syngas and react with heavy long-chained carbon molecules present in the syngas, wherein the heavy long-chained carbon molecules are cracked and/or separated into lighter and more useful carbon molecules thereby improving a calorific value of the syngas.

In accordance with a further aspect of the present invention there is provided a method for treating a flow of syngas, the method comprising the passing of a flow syngas through a cracking means, wherein the syngas is brought into contact with a chemically active substance, the chemically active substance being heated to a predetermined temperature, the syngas undergoing a reaction whereby a heavy long-chained carbon based molecule is broken into its lighter short chained carbon based molecule constituents so as to reduce the amount of tar in the flow of syngas and improve a calorific value of the syngas.

BRIEF DESCRIPTION OF THE DRAWINGS

The present invention will now be described, by way of example, with reference to the accompanying drawings, in which:

FIG. 1 is a schematic diagram showing a preferred plant layout for the process and apparatus for treatment of tar in a syngas in accordance with the present invention.

DETAILED DESCRIPTION OF THE ILLUSTRATED EMBODIMENT(S)

Referring to FIG. 1, there is shown a schematic layout of an apparatus 10 in accordance with the present invention for use in treating tar in a flow of syngas. It is to be understood that the treatment involves the reduction of tar comprising heavy, long-chained carbon molecules from the syngas. The apparatus 10 comprises a gasification/pyrolysis means 12 and a cracking means 14. The gasification/pyrolysis means 12 may comprise any kiln 11 or furnace as is known in the art. The kiln 11 typically has an insulated internal volume 13 containing a fuel source e.g. biomass (not shown) with at least one burner 18 supplying heat to the internal volume 13 and the fuel source contained therein thereby initiating a gasification/pyrolysis process and the production of a syngas. Preferably, the at least one burner 18 is fuelled at least in part by an external energy source, such as for example diesel fuel.

Preferably, the kiln 11 is provided with at least a kiln outlet 19 for the removal of the syngas produced in the kiln 11. The syngas may be delivered to other applications or storage means (not shown) such as for example a gas turbine 28. Preferably, the kiln 11 may be arranged to be in communication with a recuperator 16, the recuperator 16 providing a heat exchanger as known in the art to recover waste heat from an exhaust flue-gas of the at least one burner 18. Generally, the heat extracted from the exhaust flue-gas is used to preheat an incoming air supply thereby increasing an efficiency of combustion of the at least one burner 18. The recuperator 16 having an input piping means 17 arranged to conduct a flow of the exhaust flue-gas, and an output piping means 15 arranged to conduct a flow of a heated air supply to feed combustion with the at least one burner 18.

As seen in FIG. 1, the kiln 11 outlet 19 is in gaseous communication with the cracking means 14. Preferably by operation of a valve 34 and/or a fan 40 a flow of syngas may be directed to pass from the kiln 11 to the cracking means 14. Preferably, operation of a valve 32 may direct a flow of syngas to through piping 52 in order to act as an alternate fuel supply for the at least one burner 18. Alternatively, the syngas may be passed through piping 54 directly to a storage means (not shown) or some other application 28. It is to be understood that the process and apparatus 10 of the present invention may be varied between or operated such that any use or combination of uses of the syngas may be achieved between the at least one burner 18 alternate fuel supply, the cracking means 14 and other application 28.

In a preferred embodiment of the present invention the cracking means 14 comprises a body 42 having an internal volume 44 containing a chemically active substance, preferably a carbonaceous material, and preferably a quantity of char. Preferably, the body 42 is substantially vertical and the internal volume 44 is insulated to avoid heat loss. The body 42 has an input 41 in gaseous communication with the kiln 11 outlet 19. Similarly, the body 42 has an output 43 in gaseous communication with at least one cracking means fan 40. In a preferred embodiment of the present invention the body 42 is provided with a gauze 46 arranged to hold the quantity of char and allow a syngas to permeate through the quantity of char as it passes from the input 41 through to the output 43. Preferably, the quantity of char comprises a bed of char. Preferably, the gauze 46 may comprise an apertured stainless steel member or portion of wedge-wire arranged to support and/or hold the bed of char. Preferably the cracking means 14 provides a flow path through the body 42 between the input 41 and output 43 through which the syngas is caused to flow. The output 43 being in gaseous communication with further piping as desired to route the flow of syngas to further applications.

It is to be understood that a variety of other valves, temperature and/or pressure measurement gauges 47 may be installed throughout the process and apparatus 10 by known means in order to provide an operator with feedback on the process function and performance. In a preferred embodiment of the present invention measurement gauges 47 will be utilised at least in the cracking means 14 input 41 and output 43 as well as in the body 42 itself.

Preferably, the cracking means 14 has provision of a purge gas input (not shown), such as for example nitrogen, for use in extinguishing a fire caused by combustion of the char within the body column 42. Further, the cracking means 14 may be provided with a vibration means (not shown) to agitate the char and/or the gauze 46 within the body 42 reducing an occurrence of gas channelling or short circuiting occurring between the syngas and the char to promote mass transfer between the syngas and the char. It is to be understood that the vibration means also acts to prevent blockages or restrictions along the flow path due to tar bonding or lumping of the char.

In use, at the least one burner 18 is activated to heat the kiln 11 to a predetermined temperature, preferably around 750-850° C. The kiln 11 internal volume 13 is loaded with a raw material such as, though not limited to, biomass or coal in order to fuel the gasification/pyrolysis reaction. As the raw material is heated in a controlled atmosphere of the internal volume 13 and, the gasification/pyrolysis process occurs. Syngas is then produced and a flow of the syngas is removed from the internal volume 13 via the kiln 11 outlet 19. The syngas from the kiln 11 is generally rich in long-chained carbon based molecules which can condense to form tarry deposits along at least the piping of the kiln 11 outlet 19.

Accordingly, in a preferred embodiment of the present invention the cracking means 14 body 42 is preheated before receiving the flow of syngas so as to limit any condensation of the long-chained carbon molecules contained in the syngas. Preferably, preheating of the cracking means 14 may be achieved by heating char in the kiln 11 and then extracting the heated char via a cooling screw 20 to be supplied to the cracking means 14, and/or diverting a flow of exhaust flue-gas from the at least one burner 18 into the body 42 itself via the input 41 and piping 50. Preferably, the preheating will continue until the temperature within the body 42 internal volume 44 is around 500-600° C. at which stage exhaust flue gases may be re-diverted back to the recuperator 16 via operation of valves 31, 36. It is to be understood that any means of preheating the cracking means 14 will suffice for the operation. However, using preheated char and/or exhaust gas is likely to be a more cost efficient option.

Once the internal volume 44 of body 42 is preheated a flow of syngas is diverted through the flowpath via valves 32, 33, 34 and into the input 41. The flow of syngas being drawn through the body 42 by a fan 40. In a preferred embodiment of the present invention a rate of flow of syngas is around 2 m/s with the syngas residing within the internal volume 44 for around 0.5 seconds, however these figures are variable and dependent upon the dimensions and temperature of the cracking means 14 and the kiln 11. It is understood that as the flow of syngas passes through the bed of char within the internal volume 44 the long-chained carbon based molecules undergo a thermal cracking reaction whereby the long-chained carbon based molecules are broken into constituent lighter and simpler carbon based molecules. This results in an output flow of syngas being substantially free of tar and having an improved calorific value.

It is to be understood that as the syngas passes through the bed of char a kinetic effect of the flow of syngas combined with the vibrating bed of char may improve a rate of chemical reaction between the char and the long-chained carbon based molecules within the syngas.

It is to be understood that in addition to the cracking process wherein the char reacts with the syngas and a carbon bond of a molecule is broken, the bed of char may also act to separate aggregates of carbon molecules within the flow of syngas at least in part through adsorption without any breakage of a chemical bond.

Preferably, the bed of char will also serve a filtering purpose by entraining dust particles or other impurities from the flow of syngas.

Modifications and variations as would be apparent to a skilled addressee are deemed to be within the scope of the present invention.

The invention claimed is:

1. A method for reducing a concentration of tar in a flow of syngas, said method comprising:
   heating a biomass fuel or coal material to produce a flow of a syngas using a gasification/pyrolysis process, said syngas comprising carbon monoxide and hydrogen;
   heating a cracking means comprising a bed of char to a predetermined temperature; and
   flowing said syngas through said bed of char so that said syngas permeates through said bed of char and undergoes a thermal cracking process, wherein said thermal cracking process provides that heavy carbon-based molecules in said syngas are broken into lighter carbon-based molecule constituents, thereby reducing a concentration of said tar and improving a calorific value of said syngas.

2. A method for reducing a concentration of tar in a flow of syngas according to claim 1, wherein said biomass fuel or coal material is heated using a kiln.

3. A method for reducing a concentration of tar in a flow of syngas according to claim 1, wherein said syngas also undergoes an adsorption process when permeating through said bed of char.

4. A method for reducing a concentration of tar in a flow of syngas according to claim 1, wherein said bed of char is agitated to promote mass transfer between said syngas and said bed of char when said syngas permeates through said bed of char.

5. A method for reducing a concentration of tar in a flow of syngas according to claim 1, wherein waste heat generated by said gasification/pyrolysis process is used to preheat an incoming air supply to increase an efficiency of said heating of said biomass fuel or coal material.

6. A method for reducing a concentration of tar in syngas, the method comprising the steps of:
   producing syngas from a fuel comprising biomass and/or coal by heating the fuel in a controlled atmosphere, the syngas comprising hydrogen, carbon monoxide, and a first concentration of tar comprising long-chained carbon-based molecules;
   flowing the syngas away from the controlled atmosphere and through a bed of char, wherein the bed of char is heated to a temperature sufficient to break at least some of the long-chained carbon-based molecules that enter the bed of char into constituent carbon-based molecules that exit the bed of char, each constituent carbon-based molecule being smaller than the long-chained carbon-based molecule that was broken to produce it, whereby the syngas exiting the bed of char has a second concentration of tar that is less than the first concentration of tar.

7. A method for reducing a concentration of tar in a flow of syngas according to claim 6, wherein the step of producing syngas is performed in a pyrolysis process.

8. A method for reducing a concentration of tar in a flow of syngas according to claim 6, wherein the step of producing syngas is performed in a gasification process.

9. A method for reducing a concentration of tar in a flow of syngas according to claim 6, wherein the controlled atmosphere is inside a kiln.

10. A method for reducing a concentration of tar in a flow of syngas according to claim 6, wherein at least some carbon-based molecules of the syngas are removed from the syngas by adsorption while the syngas flows through the bed of char.

11. A method for reducing a concentration of tar in a flow of syngas according to claim 6, wherein the bed of char is agitated to promote mass transfer between the syngas and the bed of char while the syngas flows through the bed of char.

12. A method for reducing a concentration of tar in a flow of syngas according to claim 6, wherein the step of producing syngas comprises combustion of an external energy source to heat the fuel and the combustion produces waste heat, and wherein at least some of the waste heat is transferred to an air supply that feeds the combustion.

\* \* \* \* \*